July 21, 1959 T. L. HAINES 2,895,448

FILE RECORD SIGNALLING DEVICE

Filed Jan. 24, 1955

Inventor:
Theron L. Haines
By Howard H. Rogers Jr. Atty.

2,895,448

FILE RECORD SIGNALLING DEVICE

Theron L. Haines, Chicago, Ill.

Application January 24, 1955, Serial No. 483,489

1 Claim. (Cl. 116—135)

My invention relates to a file record signalling device, and more particularly to a device which may be attached to a bookkeeping record such as a page or card to signal a particular status of the record by a color coding system.

In the keeping of inventory records, for instance, it is a common practice to assign a page or card to each inventory item. It would facilitate greatly the ordering and general management of inventory stocks if the cards representing items in short supply could be identified externally of general level of the card file to indicate that a reorder of the items represented by the cards is necessary. My invention provides for a movable colored tab which may be moved to extend above the cards to provide such identification. A differently colored tab could be used on a card to signal the fact that the order has been placed. Likewise, still another color could be employed to indicate that the item represented is overstocked. A fourth color could be used to show particular urgency in reordering.

A similar signalling system could be employed in keeping credit records where, for instance, an account may be overdue or there may be limitations on the amount of credit to which the customer is entitled. My system is also applicable in the case of address lists as, for instance, indicating particular categories of addressees or the period of time since the last address revision.

To serve these purposes well, a movable tab device should be cheap, small, flat, easily affixed to the card or page, the tabs easily operated, and, once moved to a particular position, held to stay in that position. The tabs should be well anchored in the device so that they will not be accidentally lost. The achievement of these qualifications is the principal object of my invention.

Other objects and advantages will be apparent from the following description and drawings of which:

Figure 1:
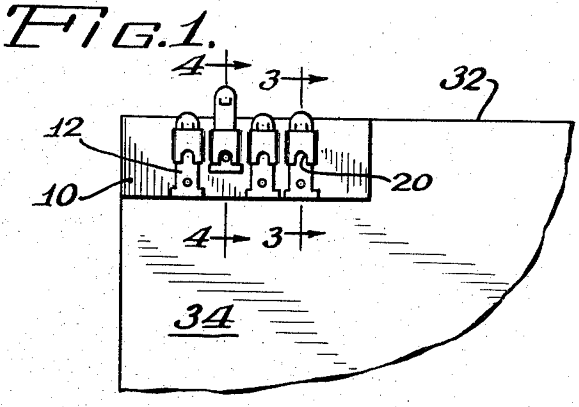
Fig. 1 is a front elevation of a fragment of a file card having my signalling device mounted thereto.

In the illustrated embodiment of my invention, the signalling device is comprised of a tab holder 10 and a plurality of tabs 12. I prefer that the tab holder 10 be formed of a thin sheet of transparent plastic such as a vinyl resin. A suitable size for the tab holder might be about two inches long and three-quarters of an inch wide, the rest of the parts of my device being substantially in proportion as illustrated. I prefer the transparency so that information on the file record which might be covered by the holder can still be seen, and even without such possibility the tab holder appears far less conspicuously on the card. The tab holder could also be formed of such material as thin metal, cardboard or other paper-like material, but the plastic has advantages of cheapness, flexibility and smoothness of surface.

The tabs 12 are mounted in the tab holder by open-ended pockets 14. The pockets 14 are formed by slitting the material of the tab holder with spaced longitudinal slits and offsetting the material between the slits outwardly. The upper slits 16 are straight and the lower slits 18 have an indentation 20 therein. The indentation leaves a tongue 21 back of the pocket. As shown, there are four such pockets formed in the tab holder with the pockets oriented transversely of the holder.

The tabs may be formed of generally the same material as the tab holder or slightly heavier. I contemplate a color coding system, and in such case they should be variously colored, but they may be provided with other distinguishing characteristics. The tabs 12 are elongated strips of the plastic material and their width should be such that they fit within the pockets 14 but bind slightly against the edges of the pocket.

The upper end of the tab 22 is rounded and the lower end has a pair of outwardly extending ears 24. A hole 26 is formed in the tab adjacent its lower end. The upper end of the tab has a three-sided cut therein and the material separated by the cut is offset to the side to define a latch 28.

The assembly of the device is very simple. The tab and tab holders are formed by punching. Thereafter one tab is inserted up through the bottom end of a pocket 14 until the ears 24 lock against the bottom end of the pocket. The latch 28 slides easily through the pocket but springs out on the upper side of the pocket to prevent a subsequent downward removal of the tab. I contemplate that each of the four tabs shown have a different color such as red, blue, yellow, and green.

Figure 2:
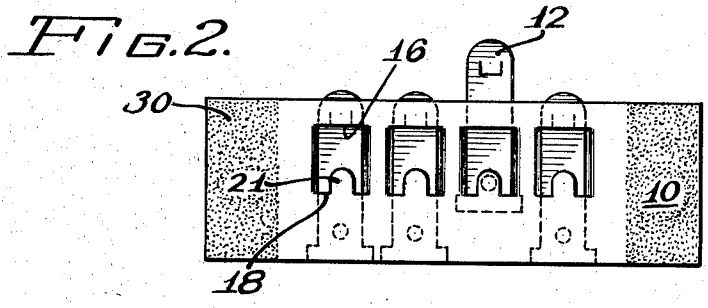
Fig. 2 is an elevation of the back side of my device.
Figure 3:
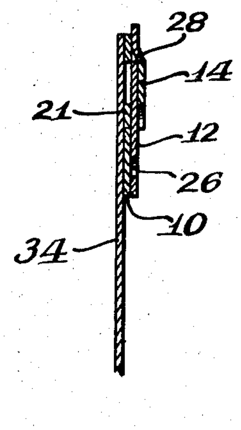
Fig. 3 is a section which may be regarded as being taken substantially along the line 3—3 of Fig. 1, looking in the direction of the arrows.
Figure 4:
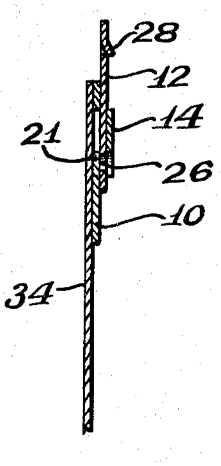
Fig. 4 is a section which may be regarded as being taken substantially along the line 4—4 of Fig. 1, looking in the direction of the arrows.
Figure 5:
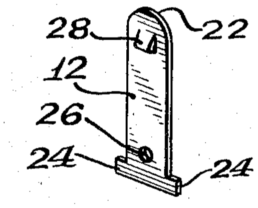
Fig. 5 is a perspective view of one of the tabs of my invention.
Figure 6:
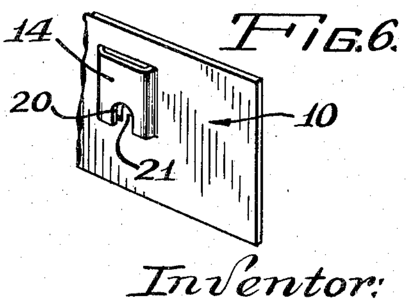
Fig. 6 is a fragmentary perspective view of the tab holder.

It will be seen that, by inserting a pencil point in the hole 26 of a tab secured in a tab pocket 14, the tab may easily be moved up and down between the limits imposed by the ears 24 at the bottom side and the latch 28 on the upper side. The range of movement of one of the tabs is illustratively shown in Figs. 1 and 2. Since the moving pencil point extends through hole 26 in the tab and bears against the plastic face of the plastic tab holders, there will be little wear associated with moving the tabs between their positions. The indentation 20 in the bottom slot 18 which defines the lower end of the pockets 14 permits a greater movement of the tab by the pencil point than would be possible if the bottom slit 18 extended straight across, and the tongue 21 insures that the pencil point remains on the plastic holder through this extended movement.

Figure 7:
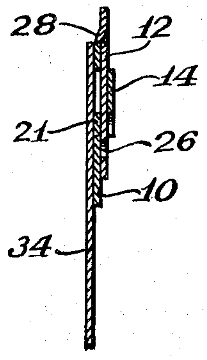
Fig. 7 is a view similar to Fig. 4 showing, however, an alternative arrangement of the parts.

Fig. 7 illustrates an alternative assembly of the tab and tab holder which may be preferred in some circumstances. The tab 12 is reversed in the pocket so that the latch 28 engages the top of the tab holder 10 rather than the upper edge 16 of the pocket. This structure results in a positive lock of the tab in its exposed position and may be employed where frequent tab changes are not made. This disadvantage of this orientation of the tab over the orientation where the latch projects forwardly is that the pencil point alone will not suffice to retract the tab. Both hands must be employed for this purpose.

The tab holder 10 should have adhesive strips 30 formed transversely thereof. It is desirable to avoid the region of the tab pockets 14 and the exposed back sides of the tabs to prevent possible sticking of the tabs. The tab holder should be secured to, for instance, the upper edge 32 of a card 34 by means of the adhesive 30. In the card file then any one of the tabs may be selectively raised to extend above the top edge of the card and appear conspicuously to a person searching the files.

Although I have described but a single embodiment of my invention, it will be appreciated that many structural alternatives are possible. I therefore prefer that my invention be regarded as being limited only as set forth in the following claim.

I claim:

A file record signalling device comprising a plastic sheet having two lines of slots therein parallel to one longitudinal edge of said sheet and spaced substantially from each other, the slots in one of said rows being transversely opposite the slots in the other of said rows, the sheet portion between opposite slots constituting open-ended pockets, the slots in the row remote from said longitudinal edge being formed to provide a relatively deep notch in the end of said pocket remote from said edge and extending toward said edge and a tongue shaped similarly to said notch on the sheet portion outside said pocket underlying said notch, individually distinctive elongated tabs having the central portions thereof movably contained in said pockets, said tabs having means at each of the ends thereof to retain said tabs movably in said pockets, said tabs being movable in said pockets to a position where one end thereof projects substantially beyond said longitudinal edge and a position where said end is substantially even with said edge, said tabs having an aperture therein adjacent the other end thereof adapted to receive a pencil point and underlying said notch and overlying said tongue when said tab is in its extended position.

References Cited in the file of this patent

UNITED STATES PATENTS

| | | |
|---|---|---|
| 1,419,394 | McKee | June 13, 1922 |
| 1,523,374 | Such | Jan. 13, 1925 |
| 1,734,496 | Lichter | Nov. 5, 1929 |
| 2,055,009 | Gollwitzer | Sept. 22, 1936 |
| 2,391,080 | Vaucher | Dec. 18, 1945 |
| 2,732,843 | Gunn et al. | Jan. 31, 1956 |

FOREIGN PATENTS

| | | |
|---|---|---|
| 23,716 | Great Britain | Oct. 14, 1897 |